July 8, 1941.　　A. HOLLINS ET AL　　2,248,236
ANTENNA GRILLE GUARD
Filed June 30, 1939　　2 Sheets-Sheet 1

INVENTOR.
BY Abraham Hollins
Jesse Hollins
ATTORNEY.

July 8, 1941.  A. HOLLINS ET AL  2,248,236
ANTENNA GRILLE GUARD
Filed June 30, 1939  2 Sheets-Sheet 2

INVENTOR.
BY
ATTORNEY.

Patented July 8, 1941

2,248,236

UNITED STATES PATENT OFFICE 2,248,236

ANTENNA GRILLE GUARD

Abraham Hollins and Jesse Hollins,
Brooklyn, N. Y.

Application June 30, 1939, Serial No. 282,188

6 Claims. (Cl. 250—33)

This invention relates to bumper guards useful as antennae, and more particularly relates to improved arrangements for automobile bumper guards, which can also serve as radio antennae.

Prior automobile antennae may be grouped into three classes: the so-called whip antennae formed of collapsible tubing mounted on the side of the car; the permanently attached under-running board antennae; and the decorative wire frame antennae mounted on top of the car. The prior vehicle antennae were generally unsatisfactory. Thus, for example, the collapsible whip antennae were subjected to vibration by wind pressure during travel, causing crackling noises in the radio reception. Both the whip and the wire frame antennae picked up considerable static interference due to their projection above the automobile nearer to elevated structures and trolley wires. The under-running board antennae were subjected to damage by rocks and particles encountered on country road travel, and also picked up considerable static interference due to its close proximity to trolley tracks, and to the static electricity generated by friction of the rubber tires in travel.

In accordance with our present invention, we contemplate novel bumper and antenna arrangements overcoming the disadvantages of the prior antenna constructions. The antenna is combined with the usual bumper of the automobile, generally on the front bumper, and is designed to harmonize with the general appearance of the vehicle. The antenna contemplated may appear as a decorative article on the car, and serve as a radiator grille protector or bumper guard. The preferred form of the invention comprises one or more cross bars or tubes insulatingly supported above the front car bumper. These bars are suitably connected together and in circuit with the radio receiver. Another set of antenna bars may be mounted on the rear bumper as well, to either increase the radio pickup for a receiver or serve as a separate antenna for a radio transmitter set.

It is accordingly an object of our present invention to provide a novel antenna system for vehicle radio operation; to provide an automobile radio antenna which picks up a minimum of static or other radio interference; to provide an automobile antenna combined with a bumper enhancing the decorative scheme of the car and serving the additional useful capacity of radiator grille protector; and to provide, in general, a novel rugged automobile antenna construction of high radio efficiency, also useful as a bumper guard.

The foregoing and other objects and advantages of the present invention will appear in the following description of exemplifications thereof, illustrated in the accompanying drawings, in which.

Figure 1:
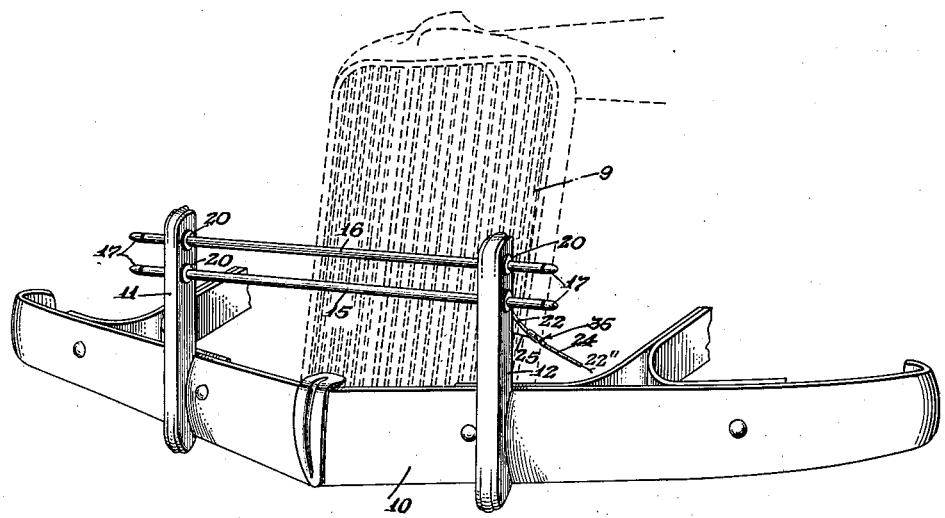
Figure 1 is a perspective view of an antenna installation on an automobile bumper.
Figure 2:
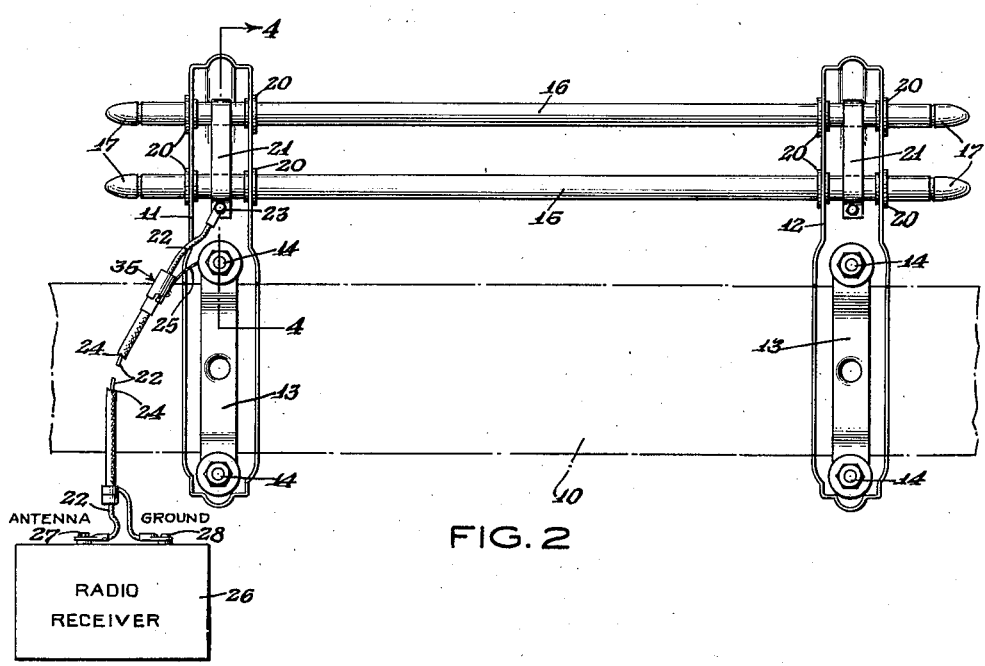
Figure 2 is an enlarged rear view of the antenna of Figure 1.

In Figure 1, a preferred physical form of the invention is shown in perspective. The bumper 10 is the usual one projecting from either end of the automobile, illustrated at the forward end in front of the usual radiator grille 9 shown dotted. Uprights 11 and 12 are secured to the bumper 10 in a suitable manner. The rear view, Figure 2, shows a strap 13 and bolt 14 arrangement for fastening upright members 11 and 12 to the bumper. Cross-bars 15 and 16 are mounted between uprights 11, 12 and are preferably horizontal and parallel as shown.

Cross-bars 15, 16 are metal tubes having decorative ends or end caps 17 for sealing the tubes from the exterior. Upright members 11, 12 are metallic, each formed as a hollow or channeled unit for rigidity as well as for permitting proper electrical connections with the cross-bars 15, 16, shown in more detail in Figures 4 to 6. Insulation bushings 20 electrically isolate bars 15, 16 from metallic uprights 11, 12 and form an integral mechanical assembly. The cross-bars combine with the uprights on the bumper to serve as a bumper guard or radiator grill protector for the automobile. The bars 15, 16 have sufficient mechanical strength to serve as a useful guard for more delicate structures behind it on the car.

The further important aspect of the invention is its arrangement as an efficient radio antenna. Cross-clamps or connectors 21 electrically join the bars 15, 16 near their ends, as shown in Figure 2, to form a unitary double-bar antenna system. One of the clamps is connected with the antenna lead-in wire 22 by a lug and bolt connection 23. The lead-in wire 22 is electrically shielded by a metallic braid 24 concentric over the otherwise insulatingly covered cable 22. Shield 24 is connected to the framework of the car through wire 25 connected electrically with the bumper 10 and the framework of the car. A radio receiver is shown diagrammatically at 26 with the antenna and ground terminals 27 and 28 respectively connected with the lead-in 22 and sheath 24 through lugs and bolts to prevent loosening by vibration.

Figure 3:
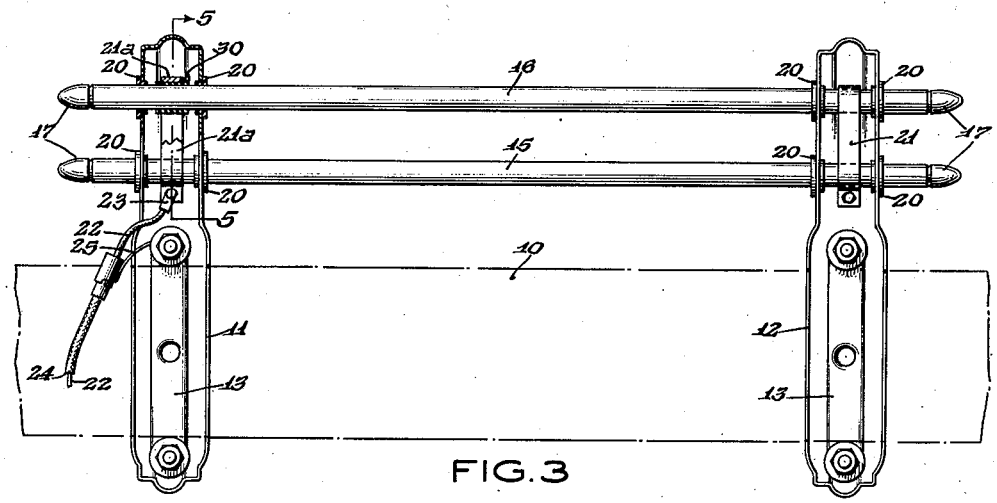
Figure 3 is a rear view, partially in section, of a modified form of the antenna.

The effective length of the antenna may be doubled by insulating one of the cross-bars from one of the cross-connection elements. Figure 3 shows this form of the invention. An insulation bushing 30 is placed between upper bar 16 and the left cross-strap 21a to electrically isolate the members at that region. The effective electrical length of the antenna system is practically that of both bars, since bars 15, 16 are electrically joined only at their right side. The cross-bars are electrically isolated from the bumper through insulation bushings 20, and serves as an efficient antenna system.

Figures 5, 6:
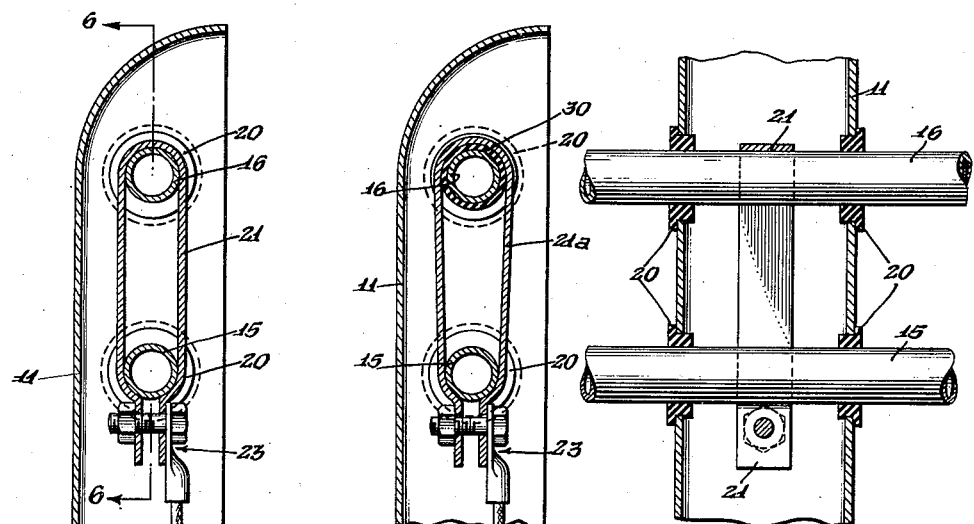
Figure 5 is an enlarged transverse sectional view through the antenna of Figure 3, taken along line 5—5 thereof.
Figure 6 is a cross-sectional view showing the mounting of the antenna cross-bars taken along line 6—6 of Figure 4.
Figures 4, 7:
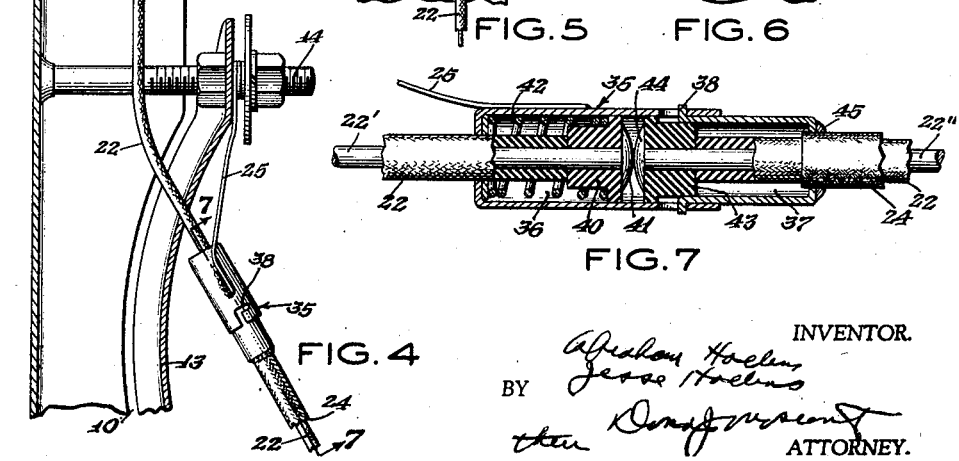
Figure 4 is an enlarged transverse sectional view through the antenna of Figure 2, taken along line 4—4 thereof.
Figure 7 is a longitudinal cross-sectional view through the antenna connection plug.

Details of preferred mounting and assembly arrangements for the device of the invention are shown in the enlarged sectional views, Figures 4 to 6. Figure 4 shows the electrical joining of cross-bars 15, 16 by straps 21, as used on either side of the bars of Figure 2, and only on the right side of Figure 3. The upper bar 16 is insulated from strap 21a by bushing 30, as seen in Figure 5. Figure 6 shows the details of the electrical isolation of the cross-bars 15, 16 from the metallic uprights 11 (and 12) by bushings 20. Bushings 20 and 30 may be fiber, rubber, composition or ceramic, as desired. The connection straps 21 assist in mechanically binding bars 15, 16 in position between uprights 11, 12. The insulation bushings further serve as a protective medium for preventing rusting of the cross-bars and uprights by minimizing corrosion. The holes in steel uprights 11, 12 are punched or drilled and hence would have a tendency to cut through and rust the plated surface of cross-bars 15, 16, were it not for bushings 20. The bushings 20 and 30 also eliminate electrolytic corrosion or rusting due to moisture at these joints of dissimilar metallic surfaces.

Figure 7 is a cross-sectional view through a preferred form of connection plug 35 for joining the radio receiver to the antenna system. The plug 35 has two separable sections 36, 37 interlocked by a bayonet joint 38. Lead-in cable 22 contains conductor 22' terminating in insulation piece 40 with a protruding rounded head 41. A spring 42 is arranged within section 36 to bias movable piece 40 against the adjacent piece 43 of section 37. Conductor 22" at the right end terminates as a rounded head 44 at insulation piece 43, opposite head 41 of conductor section 22'. The spring 42 insures continuous electrical contact between conductor sections 22' and 22" of lead-in cable 22 to the radio receiver or transmitter. The braided shield 24 is gripped by the end 45 of section 37 of plug 35 and continuously shields the lead-in cable within it. The casings of sections 36 and 37 are metallic. A flexible lead 25 is secured to shield 36 and is connected to ground or the framework of the car as described. The shield 24 is connected to the ground terminal of the radio receiver, as shown in Figure 2.

It is to be understood that more than two cross-bars may well be used, or even only one if desired. The multiple bars may all be connected in parallel, as shown in Figure 2, or may be in series connection as indicated in Figure 3. The antenna bars are preferably mounted on the front bumper, extending above it as illustrated. It is feasible, however, to mount them below the bumper, or even on the rear bumper, as desired. At the front, above the bumper, it serves effectively both as a radiator grille protector as well as antenna. In any event its utility as a so-called bumper guard is apparent in any position on the car. Two sets of such cross-bar antennae, one mounted on each end of the car, can serve for simultaneous radio transmission and reception from the car with suitable radio equipment connected to each antenna. Another form is to electrically isolate each cross-bar or group of cross-bars in a single mechanical unit, and use each isolated cross-bar group as a separate antenna system as required.

A material advantage of the disclosed antenna system is its relative position on the automobile. It is placed on a level intermediate the prior art overhead antenna which picked up static interference from commercial wires and trolley lines, and the low level running board antennae, which picked up interference from trolley tracks and the tire friction static. A useful compromise therefore results, reducing extraneous signal pickup to a minimum.

Although the cross-bars 15 and 16 have herein been shown as hollow tubes, it is within the province of this invention to provide such cross-bars as solid bars.

Although we have illustrated preferred forms which our invention may assume in practice, it is to be understood that variations of it may be practiced without departing from the broader spirit and scope thereof, and accordingly we do not intend to be limited except as set forth in the following claims.

We claim:

1. An antenna for a vehicle comprising a plurality of cross-bars, a pair of metallic upright members for supporting said cross-bars horizontally, insulation bushings separating said cross-bars from said members, a connection strap electrically joining said cross-bars, a lead-in connection from said cross-bars for a radio receiver, whereby said cross-bars are electrically connectible to said receiver and electrically isolated from the framework of said vehicle.

2. An antenna for a vehicle having a bumper comprising a plurality of cross-bars, a pair of metallic upright members fastenable to said bumper for supporting said cross-bars horizontally above said bumper, insulation bushings separating said cross-bars from said members, a connection strap electrically joining said cross-bars, said cross-bars being metallic and hollow, a lead-in connection from said cross-bars for a radio receiver, said cross-bars being sufficiently rigid and so arranged as to serve as an effective bumper guard for said vehicle.

3. An antenna for a vehicle having a bumper comprising a plurality of cross-bars, a pair of metallic upright members fastenable to said bumper for supporting said cross-bars horizontally, insulation bushings separating said cross-bars from said members, a connection strap electrically joining said cross-bars, a second connection strap mechanically joining said cross-bars, said connection straps mechanically gripping said cross-bars with said upright members, a lead-in connection from one of said connection straps for a radio receiver, whereby said cross-bars are electrically connectible in parallel to said receiver and electrically isolated from the framework of said vehicle.

4. An antenna for a vehicle having a bumper comprising a plurality of cross-bars, a pair of metallic upright members fastenable to said bumper for supporting said cross-bars horizontally above said bumper, insulation bushings separating said cross-bars from said members, a connection strap electrically joining said cross-bars, a second connection strap mechanically joining said cross-bars and an insulating bushing between one of said cross-bars and said second strap to electrically isolate said one bar therefrom, said connection straps mechanically gripping said cross-bars with said upright members, whereby said cross-bars are electrically connectible in series and electrically isolated from the framework of said vehicle.

5. An antenna for a vehicle having a bumper comprising a plurality of cross-bars, a pair of metallic upright members fastenable to said bumper for supporting said cross-bars horizontally, insulation bushings separating said cross-bars from said members, a connection strap electrically joining said cross-bars, a second connection strap mechanically joining said cross-bars, said connection straps mechanically gripping said cross-bars with said upright members, said cross-bars being sufficiently rigid and so arranged in front of the vehicle radiator grille to serve as a protector therefor while functioning as an efficient radio antenna.

6. A bumper guard operable as a radio antenna and mountable upon a bumper of a vehicle comprising a plurality of cross-bars, a pair of metallic upright members fastenable to said bumper for supporting said cross-bars horizontally above said bumper, insulation bushings separating said cross-bars from said members, a connection strap electrically joining said cross-bars, a lead-in connection from said cross-bars for a radio receiver.

ABRAHAM HOLLINS.
JESSE HOLLINS.